United States Patent Office 2,771,703
Patented Nov. 27, 1956

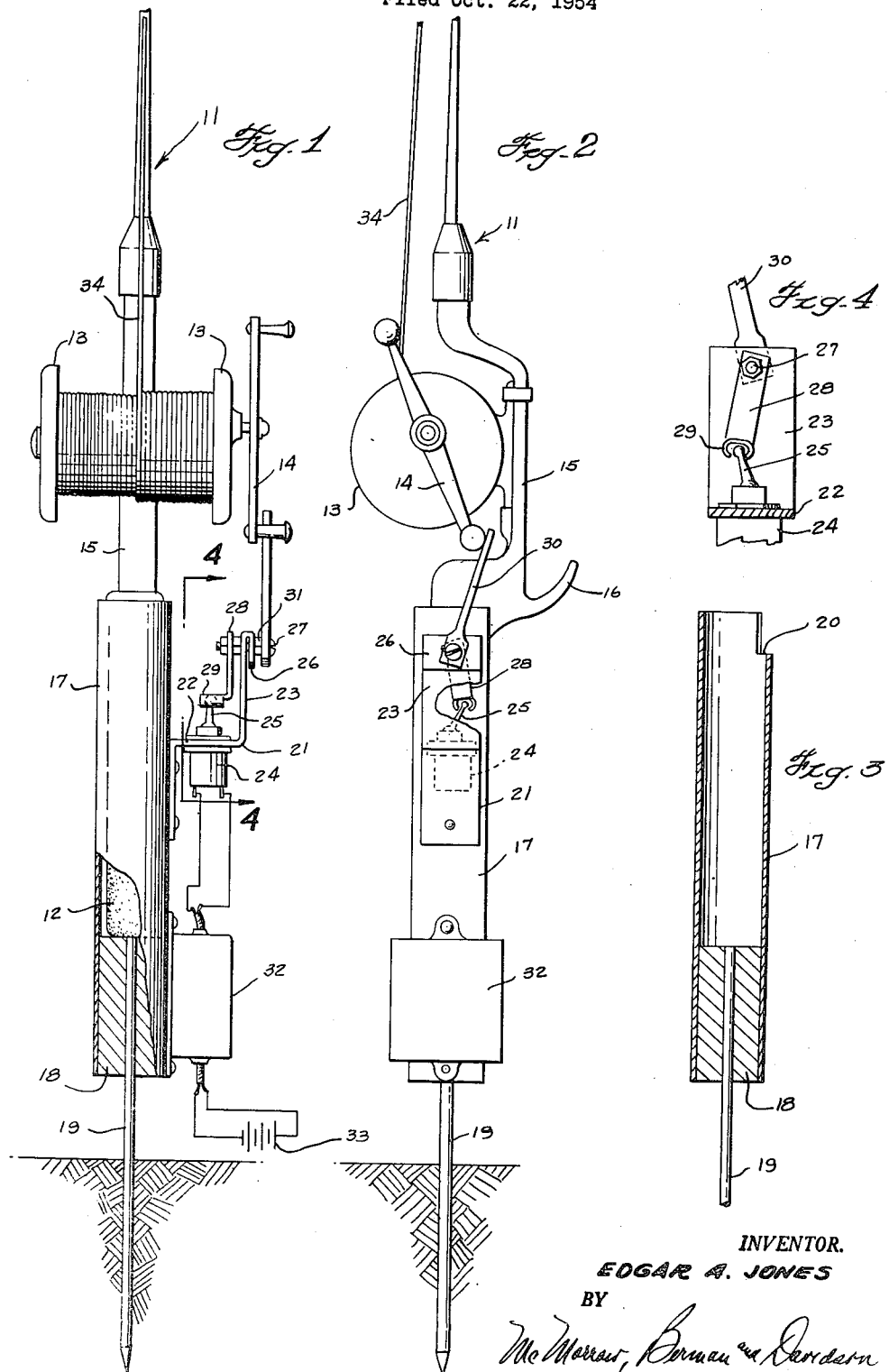

2,771,703

FISHING LINE SIGNAL DEVICE

Edgar August Jones, Beaver Dam, Wis.

Application October 22, 1954, Serial No. 463,980

2 Claims. (Cl. 43—17)

This invention relates to signal devices, and more particularly to an improved signalling device for use with a fishing rod to notify the fisherman when the hook has been struck.

A main object of the invention is to provide a novel and improved fishing line signal device which is simple in construction, which is easy to set up for use, and which provides an audible signal when the reel of a fishing line supported thereon rotates due to the engagement of a fish with the hook.

A further object of the invention is to provide an improved alarm device for use with a fishing rod, said alarm device being inexpensive to fabricate, being durable in construction, being reliable in operation, and involving only a few parts.

Further objects and advantages of the invention will become apparent from the following description and claims, and from the accompanying drawings, wherein:

Figure 1 is a side elevational view, partly in cross section, of an improved alarm device according to the present invention, shown set up for use and supporting a fishing rod.

Figure 2 is a front elevational view of the device of Figure 1 and showing the arrangement of the reel of the fishing rod relative to the operating arm of the signal device.

Figure 3 is a vertical cross sectional view taken through the socket element of the signal device employed in Figures 1 and 2.

Figure 4 is an enlarged cross sectional detail view taken on the line 4—4 of Figure 1.

Referring to the drawings, 11 designates a conventional fishing rod of the type having a handle 12 and a rotatable reel 13, the reel being provided with a crank 14 located adjacent the handle 12. As shown in Figure 2, the fishing rod 11 includes the conventional offset bracket portion 15 on which the reel 13 is mounted and includes the hooked finger grip element 16.

Designated at 17 is an elongated tubular socket member in the lower end of which is rigidly secured the plug element 18. Axially secured in the plug element 18 is the pointed, ground-engaging stake member 19 which is adapted to be engaged in the ground to support the socket 17 in an upstanding position, as shown in Figures 1 and 2.

As shown in Figures 1, 2 and 3, the socket element 17 is adapted to receive the handle 12 of a fishing rod, and the top portion of the socket element 17 is notched at 20 to receive the lower end of the offset portion 15, whereby the fishing rod is supported in the socket element 17 and is held against rotation by the interlocking engagement of the lower end of the offset portion 15 with the notch 20.

Mounted on the upper portion of the socket element 17 is the bracket 21, said bracket being provided with the main flange portion 22 extending perpendicularly to the axis of the socket element 17 and being provided with the end flange 23 extending parallel to said axis. Mounted in the main flange 22 is the toggle switch 24, said toggle switch having the operating handle 25 projecting upwardly between the end flange 23 and the socket 17, as shown in Figure 1. The top portion of the end flange 23 is formed with the U-bend 26, and journaled in said top end, extending transversely through said U-bend, is the shaft bolt 27. Rigidly secured to the inner end of the shaft bolt 27 is a first arm 28 which is formed at its end with the downwardly facing channeled sleeve 29 engaging over the end of the switch handle 25, whereby the switch handle 25 is rotated responsive to rotation of the bolt member 27. As shown in Figure 4, the arm 28 is thus operatively connected to the end of the switch handle 25, and rotation of the shaft 27 counterclockwise, as viewed in Figure 4, will rotate the switch handle 25 clockwise, whereby the switch is operated from its normally opened position to its closed position.

Secured to the outer end of the bolt 27, namely, to the head portion of the bolt, is the upstanding arm 30, said arm 30 being rigidly clamped to the bolt, as by a locking nut 31, whereby rotation of the arm 30 causes the bolt to be rotated. When the handle 12 of the fishing rod is engaged in the socket 17, as shown in Figures 1 and 2, the arm 30 is arranged adjacent the crank 14, and, as is shown in Figure 2, counterclockwise rotation of the crank 14 will rotate the arm 30 clockwise, as viewed in Figure 2, to close the switch 24. It will be further noted from Figure 2 that when the arm 30 has been rotated clockwise to close switch 24, the crank 14 may thereafter rotate without interference from the arm 30, whereby the line may be freely unreeled after a fish has struck.

Mounted on the lower portion of the socket member 17 is the electrically operated buzzer 32. A suitable battery 33 is provided which is connected in series with the buzzer 32 and the switch 24, whereby the buzzer 32 becomes energized when switch 24 is closed.

As above explained, when a fish strikes, the fishing line 34 is pulled and the reel 13 is rotated by the tension on the line. This causes the crank 14 to rotate counterclockwise, as viewed in Figure 2, and causes the arm 30 to be rotated clockwise, to close switch 24, as previously explained. The closure of switch 24 causes the buzzer 32 to be energized and to provide an audible signal which notifies the fisherman that the reel 13 is rotating. The fisherman may then remove the fishing rod from the socket element 17 and return the arm 30 to its normal position, shown in Figure 2, whereby the switch 24 is opened. The device is thus placed in condition for the next utilization thereof.

While a specific embodiment of an improved alarm device for use with a fishing rod has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An alarm device for use with a fishing rod of the type having a handle and a rotatable reel provided with a crank located adjacent said handle, said alarm device comprising a tubular socket member arranged to telescopically receive said handle therein, means at one end portion of said socket member formed and arranged to lockingly interengage with a portion of the handle to prevent rotation of said handle in said socket, a ground-engaging stake element rigidly secured to one end of said socket member alarm element, a toggle switch mounted on said socket member, and electrically connected to said alarm element, an arm pivotally mounted to said socket member, and means operatively connecting one end of said arm to said toggle switch, said means being so positioned as to be operatively engaged by said crank as the reel rotates.

2. The structure according to claim 1 wherein said means includes an angle bracket secured to said socket member, said toggle switch being mounted on said bracket, a shaft rotatably mounted on said bracket, a first arm rigidly connected to said shaft and being operatively connected to said toggle switch, and a second arm rigidly connected to said shaft, said second arm extending upwardly adjacent said crank and being engageable by said crank responsive to rotation of the reel.

References Cited in the file of this patent

UNITED STATES PATENTS

| | | |
|---|---|---|
| 2,406,427 | Leonard | Aug. 27, 1946 |
| 2,446,427 | Linder | Aug. 3, 1948 |
| 2,548,351 | Combs | Apr. 10, 1951 |
| 2,599,099 | Folker | June 3, 1952 |
| 2,645,050 | Golias | July 14, 1953 |